(12) United States Patent
Kim et al.

(10) Patent No.: US 12,136,862 B2
(45) Date of Patent: Nov. 5, 2024

(54) MOTOR

(71) Applicant: LG INNOTEK CO., LTD., Seoul (KR)

(72) Inventors: Tae Ho Kim, Seoul (KR); Ja Young Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 400 days.

(21) Appl. No.: 17/763,350

(22) PCT Filed: Sep. 23, 2020

(86) PCT No.: PCT/KR2020/012834
§ 371 (c)(1),
(2) Date: Mar. 24, 2022

(87) PCT Pub. No.: WO2021/060817
PCT Pub. Date: Apr. 1, 2021

(65) Prior Publication Data
US 2022/0337115 A1    Oct. 20, 2022

(30) Foreign Application Priority Data

Sep. 25, 2019    (KR) .................. 10-2019-0118091

(51) Int. Cl.
*H02K 3/34* (2006.01)
*H02K 1/16* (2006.01)
*H02K 3/12* (2006.01)

(52) U.S. Cl.
CPC ............... *H02K 3/345* (2013.01); *H02K 1/16* (2013.01); *H02K 3/12* (2013.01)

(58) Field of Classification Search
CPC .. H02K 1/16; H02K 3/12; H02K 3/34; H02K 3/345
USPC .................................... 310/216.008, 216.009
See application file for complete search history.

(56) References Cited

U.S. PATENT DOCUMENTS

| 9,490,675 | B2 * | 11/2016 | Kim .................. H02K 3/32 |
| 2012/0293024 | A1 | 11/2012 | Yokogawa et al. |
| 2013/0115064 | A1 | 5/2013 | Kimura et al. |
| 2014/0009028 | A1 | 1/2014 | Shijo et al. |
| 2015/0061452 | A1 | 3/2015 | Nakatake et al. |
| 2017/0201135 | A1 * | 7/2017 | Kai .................. H02K 3/18 |

(Continued)

FOREIGN PATENT DOCUMENTS

| JP | 2003-324880 A | 11/2003 |
| JP | 2005-133585 A | 5/2005 |

(Continued)

*Primary Examiner* — Jeremy A Luks
(74) *Attorney, Agent, or Firm* — Birch, Stewart, Kolasch & Birch, LLP

(57) ABSTRACT

The present invention provides a motor including a shaft, a rotor coupled to the shaft, and a stator disposed outside the rotor, wherein the stator includes a stator core, insulators disposed on the stator core, coils disposed on the insulators, and insulating members disposed between the insulators in a circumferential direction, the insulator includes a body on which the coil is disposed and a guide extending from one side of the body, the guide includes a protrusion protruding from an inner circumferential surface toward a center of the stator, and a lower portion of the protrusion includes a first inclined surface.

10 Claims, 11 Drawing Sheets

(56) References Cited

U.S. PATENT DOCUMENTS

2018/0006511 A1\* 1/2018 Kong ........................ H02K 1/16
2024/0097518 A1\* 3/2024 Tamura ................ H02K 15/022

FOREIGN PATENT DOCUMENTS

| JP | 2009-105996 A | 5/2009 | | |
|----|---|---|---|---|
| KR | 10-2013-0032330 A | 4/2013 | | |
| KR | 10-2013-0124564 A | 11/2013 | | |
| KR | 10-2015-0027714 A | 3/2015 | | |
| KR | 10-2016-0084720 A | 7/2016 | | |
| KR | 20190054403 A | \* | 5/2019 | |
| WO | WO-2019132338 A1 | \* | 7/2019 | ............... B62D 5/04 |

\* cited by examiner

[FIG. 1]
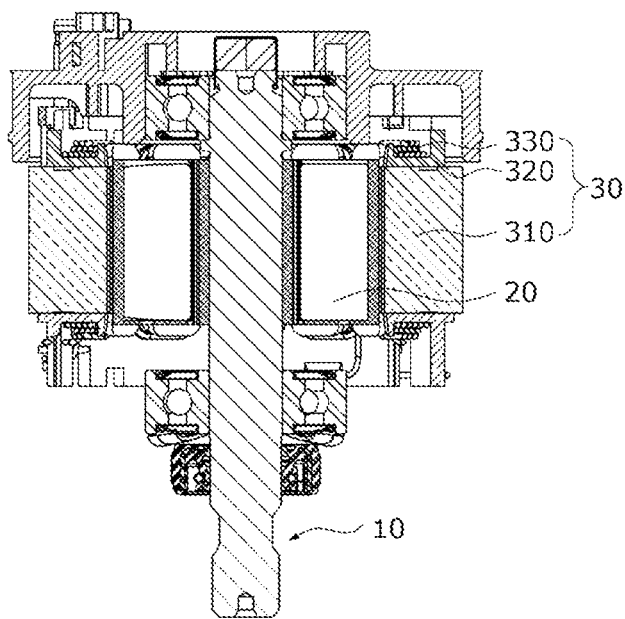

[FIG. 2]
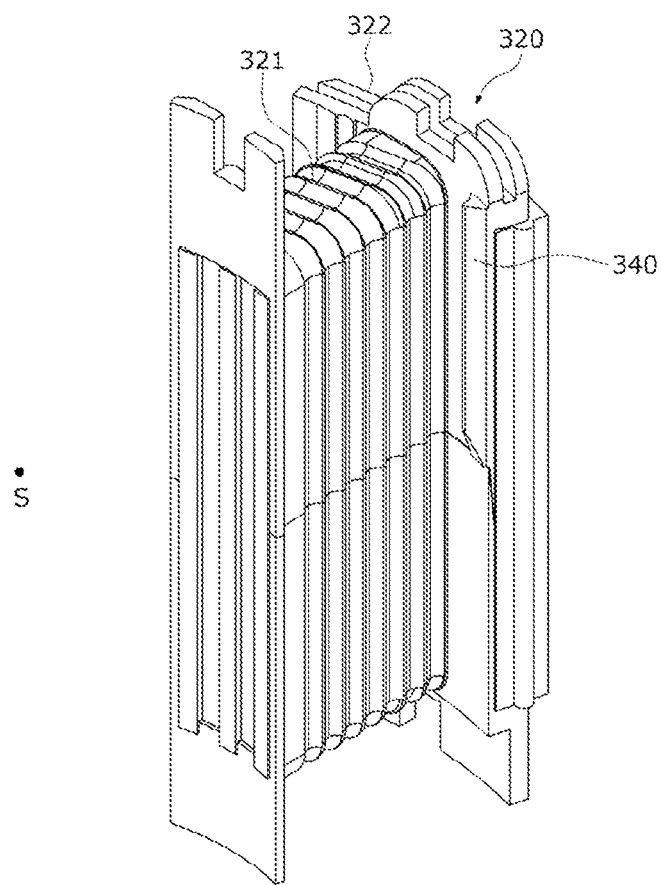

[FIG. 3]
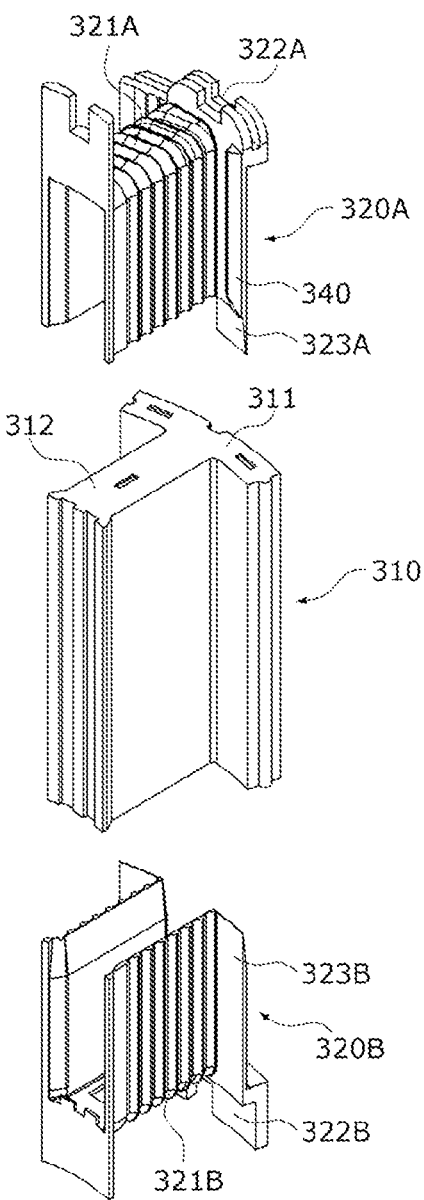

[FIG. 4]
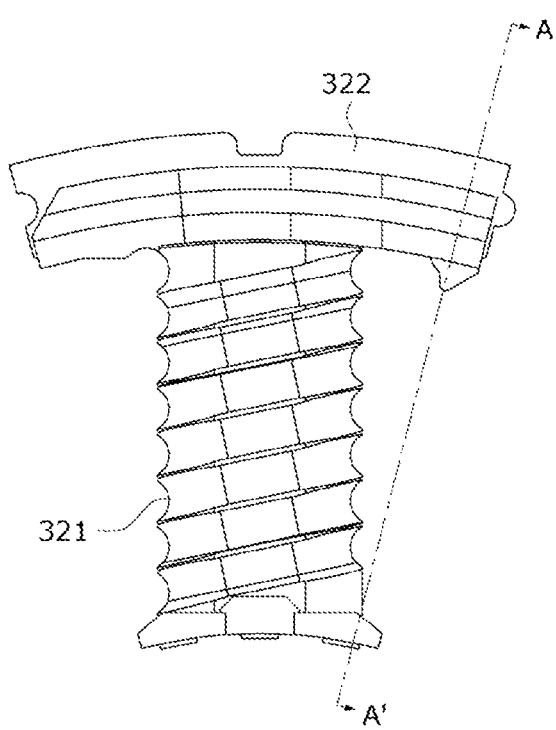

[FIG. 5]
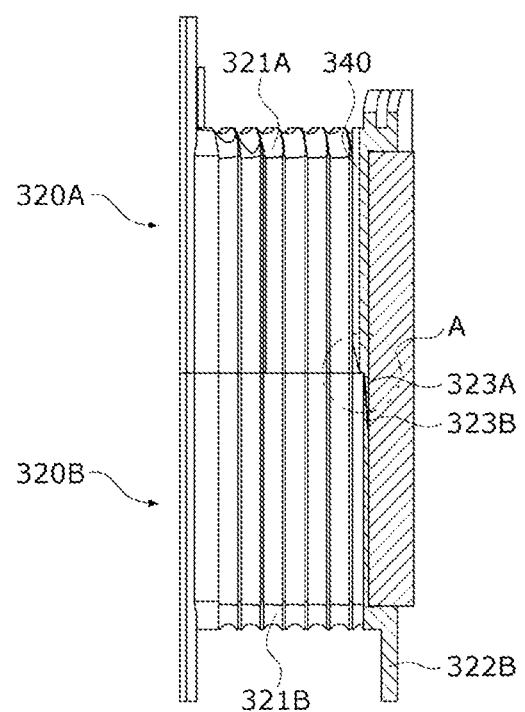

[FIG. 6]
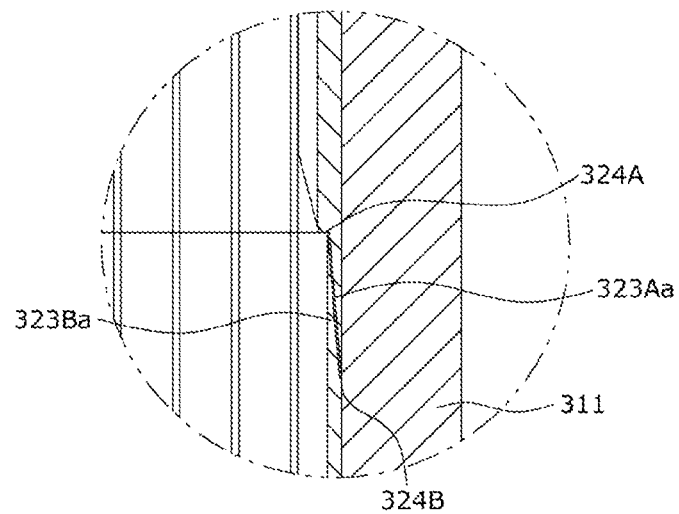

[FIG. 7]
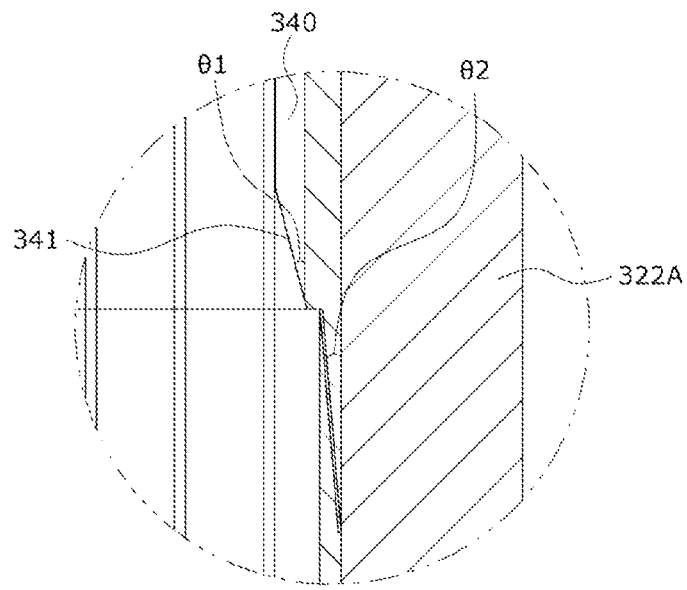

[FIG. 8]
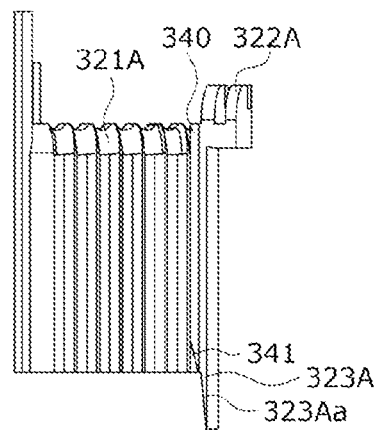

[FIG. 9]
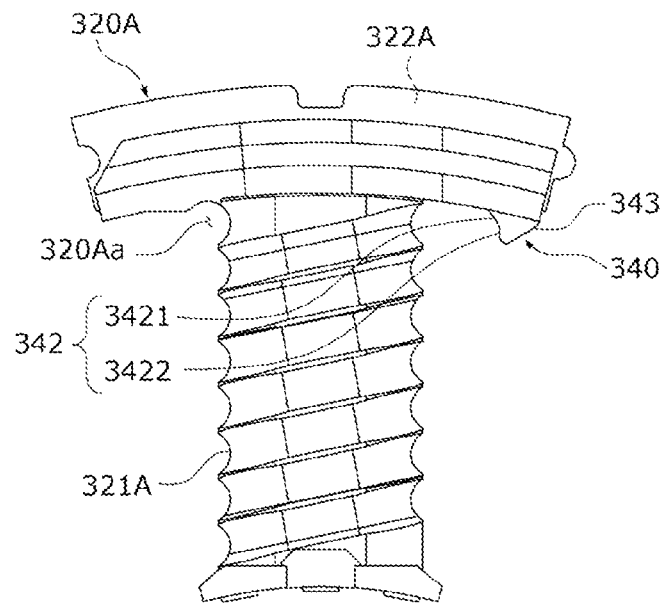

[FIG. 10]
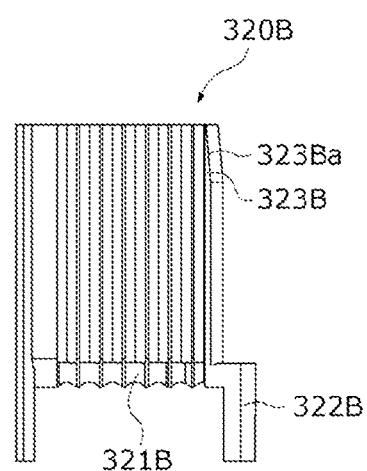

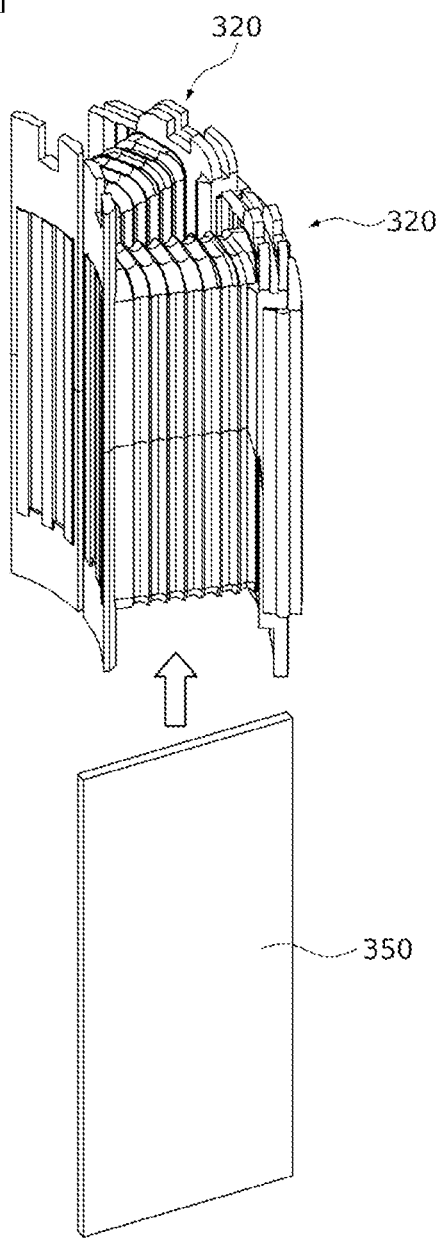
[FIG. 11]

MOTOR

CROSS REFERENCE TO RELATED APPLICATIONS

This application is the National Phase of PCT/KR2020/012834 filed on Sep. 23, 2020, which claims priority under 35 U.S.C. § 119(a) to Patent Application No. 10-2019-0118091 filed in the Republic of Korea on Sep. 25, 2019, all of which are hereby expressly incorporated by reference into the present application.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

A motor may include a housing, a shaft, a stator disposed on an inner circumferential surface of the housing, a rotor disposed on an outer circumferential surface of the shaft, and the like. In this case, an electrical interaction is induced between the stator and the rotor of the motor so that rotation of the rotor is induced.

In this case, the stator may include a stator core, coils wound around the stator core, and insulators disposed between the stator core and the coils. In addition, the stator may further include insulating sheets disposed between the coils.

In this case, since the insulating sheets are disposed in a state in which the stator is assembled with the housing, it is difficult to assemble the insulating sheets at uniform positions.

In addition, in a process in which the insulating sheets are inserted between the coils, a phenomenon occurs in which the insertion of the insulating sheet is interfered with by a protrusion for fixing the coil to the insulator.

Technical Problem

The present invention is directed to providing a motor which allows assembly of an insulator and insertion of an insulating sheet to be easy.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, and a stator disposed to correspond to the rotor, wherein the stator includes a stator core, insulators disposed on the stator core, coils disposed on the insulators, and insulating members disposed between the insulators in a circumferential direction, the insulator includes a body on which the coil is disposed and a guide extending from one side of the body, the guide includes a protrusion protruding from an inner surface toward a center of the stator, and a lower portion of the protrusion includes a first inclined surface.

The protrusion may include a first side surface facing the body and a second side surface formed at a side opposite to the first side surface, and the first side surface and the second side surface become closer toward the center of the stator.

The first side surface may include a first surface extending from the guide and a second surface extending from the first surface, the first surface and the second surface may have different inclination angles, and the first surface and the second surface may form an angle less than 180° toward the body.

The first inclined surface may form a first inclination angle with an inner circumferential surface of the guide to be further away from the center of the stator toward a lower side of the first inclined surface, and the first inclination angle may be in the range of 20 to 50°.

The insulator may include a first insulator and a second insulator coupled to the first insulator, the first insulator may include a first end portion connected to the second insulator, the second insulator may include a second end portion connected to the first insulator, and the first end portion may be disposed inside the second end portion.

The stator core may include a yoke and a tooth protruding from an inner circumferential surface of the yoke in a radial direction, the first end portion may be in contact with the inner circumferential surface of the yoke, and the second end portion may be spaced apart from the inner circumferential surface of the yoke.

The first end portion may include a second inclined surface in contact with the second end portion, and the second end portion may include a third inclined surface which complements the second inclined surface.

The second inclined surface may form a second inclination angle with the inner circumferential surface of the yoke, and the second inclination angle may be smaller than the first inclination angle.

A ratio of the second inclination angle to the first inclination angle may be in the range of 0.1 to 0.2.

The first insulator may include a first step in contact with the second end portion, and the second insulator may include a second step in contact with the first end portion.

Advantageous Effects

According to embodiments, since an inclined surface of a protrusion is formed in a direction in which an insulating sheet is inserted, a hooking phenomenon is minimized when the insulating sheet is inserted, and assemblability of a stator can be improved.

In addition, according to the embodiments, since a structure in which a second insulator is inserted into a first insulator along an inclined surface of the first insulator is provided, coupling of the first insulator and the second insulator is easy, and thus the assemblability of the stator can be further improved.

DESCRIPTION OF DRAWINGS

FIG. 1 is a cross-sectional view illustrating a motor according to one embodiment of the present invention motor.

FIG. 2 is a perspective view illustrating a stator core and an insulator according to one embodiment of the present invention.

FIG. 3 is an exploded perspective view illustrating the stator core and the insulator according to one embodiment of the present invention.

FIG. 4 is a plan view illustrating the stator core and the insulator according to one embodiment of the present invention.

FIG. 5 is a side view illustrating a state along line A-A' in FIG. 4.

FIGS. 6 and 7 are enlarged views illustrating region A in FIG. 5.

FIG. 8 is a side view illustrating a first insulator according to one embodiment of the present invention.

FIG. 9 is a plan view illustrating the first insulator according to one embodiment of the present invention.

FIG. 10 is a side view illustrating a second insulator according to one embodiment of the present invention.

FIG. 11 is a perspective view illustrating a state in which an insulating member is being inserted between insulators according to one embodiment of the present invention.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. In addition, in the description of the invention, detailed descriptions of related well-known functions which unnecessarily obscure the gist of the invention will be omitted.

It will be understood that, although the terms "first," "second," etc. may be used herein to describe various elements, these elements should not be limited by these terms. These terms are only used to distinguish one element from another element.

For example, a first element could be termed a second element, and a second element could similarly be termed a first element without departing from the scope of the present invention. The term "and/or" includes combinations or any one of a plurality of associated listed items.

FIG. 1 is a side cross-sectional view illustrating a motor according to one embodiment of the present invention motor.

Referring to FIG. 1, the motor according to the embodiment may include a shaft 10, a rotor 20, and a stator 30.

The shaft 10 may be coupled to the rotor 20. When a current is supplied and an electromagnetic interaction occurs between the rotor 20 and the stator 30, the rotor 20 rotates, and the shaft 10 rotates in conjunction with the rotation of the rotor. The shaft 10 may be connected to a steering shaft of the vehicle to transmit power to the steering shaft.

The rotor 20 is rotated due to an electrical interaction with the stator 30.

The rotor 20 may include a rotor core and magnets. The rotor core may be formed in the form in which a plurality of thin circular steel plates are stacked or in one cylindrical form. A hole to which the shaft 10 is coupled may be disposed at a center of the rotor core. Protrusions which guide the magnets may be formed on an outer circumferential surface of the rotor core. The magnets may be attached to the outer circumferential surface of the rotor core. The plurality of magnets may be disposed at predetermined intervals along a circumference of the rotor core. The rotor 20 may include a can member which surrounds the magnets to fix the magnets to the rotor core and prevent the magnets from departing from the rotor core and being exposed.

The stator 30 may include a stator core 310, insulators 320, and coils 330. The insulators 320 are installed on the stator core 310. The coils 330 are wound around the insulators 320. When power is applied to the coils 330, induced currents are generated. The coils 330 induce electrical interactions with the rotor 20.

FIG. 2 is a perspective view illustrating the stator core and the insulator according to one embodiment of the present invention, FIG. 3 is an exploded perspective view illustrating the stator core and the insulator according to one embodiment of the present invention, and FIG. 4 is a plan view illustrating the stator core and the insulator according to one embodiment of the present invention.

Referring to FIGS. 2 to 4, the stator core 310 includes yokes 311 and teeth 312. The yokes 311 may be formed in arc shapes. The teeth 312 may be formed to protrude from inner circumferential surfaces of the yokes 311 in a radial direction. The teeth 312 may be radially disposed about a center of the stator 30. The yokes 311 may be integrally formed with the teeth 312.

The insulator 320 may include a body 321 and a guide 322. The body 321 is a portion around which the coil 330 is disposed to be wound. The guide 322 is disposed to extend from an outer side of the body 321.

More specifically, as in FIG. 3, the insulator 320 includes a first insulator 320A which surrounds an upper portion of the stator core 310 and a second insulator 320B which surrounds a lower portion of the stator core 310. In this case, the first insulator 320A and the second insulator 320B may be coupled in an axial direction.

The first insulator 320A may include a first body 321A and a first guide 322A. An upper portion of the wound coil 330 is disposed on the first body 321A. In addition, the first guide 322A extends upward from an outer side of the first body 321A. In this case, the first guide 322A may include a first end portion 323A at a lower end. The first end portion 323A is connected to the second insulator 320B. In this case, the first end portion 323A may protrude toward the second insulator 320B further than the first body 321A.

FIG. 5 is a side view illustrating a state along line A-A' in FIG. 4, and FIGS. 6 and 7 are enlarged views illustrating region A in FIG. 5.

Referring to FIGS. 5 and 6, an inner surface of the first end portion 323A may be in contact with the inner circumferential surface of the yoke 311. In this case, a thickness of the first end portion 323A may be smaller than thicknesses of other portions of the first guide 322A. In addition, a second inclined surface 323Aa may be formed on an outer surface of the first end portion 323A. In this case, a surface facing the inner circumferential surface of the yoke 311 of the first end portion 323A is referred to as the inner surface, and a surface opposite to the inner surface is referred to as the outer surface.

The second inclined surface 323Aa is further away from the center of the stator 30 toward a lower side of the second inclined surface 323Aa. Referring to FIG. 7, a first inclination angle $\theta 2$, which is an acute angle, is formed between the second inclined surface 323Aa and the inner circumferential surface of the yoke 311.

In addition, a first step 324A is formed on the first guide 322A at an upper side of the first end portion 323A.

The second insulator 320B may include a second body 321B and a second guide 322B. The second body 321B is coupled to a lower end of the first body 321A. In this case, the coil 330 is disposed to be wound around the second body 321B. The second guide 322B extends upward from an outer side of the second body 321B. In this case, the second guide 322B is coupled to a lower end of the first guide 322A. In addition, the second guide 322B may include a second end portion 323B at an upper end. In this case, the second end portion 323B is connected to the first end portion 323A.

The second end portion 323B may be spaced apart from the inner circumferential surface of the yoke 311. In this case, the first end portion 323A is disposed between the second end portion 323B and the yoke 311. In this case, the first end portion 323A and the second end portion 323B may overlap in a circumferential direction.

A thickness of the second end portion 323B may be smaller than thicknesses of other portions of the second guide 322B. A third inclined surface 323Ba may be formed on an inner surface of the second end portion 323B. In this case, the third inclined surface 323Ba is in contact with the second inclined surface 323Aa.

The third inclined surface 323Ba is further away from the inner circumferential surface of the yoke toward an upper side of the third inclined surface 323Ba. The third inclined surface 323Ba may have an inclination angle corresponding to the second inclined surface 323Aa. In this case, the second end portion 323B may be in contact with the first step 324A.

In addition, the second guide 322B may include a second step 324B is formed at a lower side of the second end portion 323B. In this case, the first end portion 323A may be in contact with the second step 324B.

The insulator 320 has a structure in which the first insulator 320A is coupled to an upper side of the stator core 310, the second insulator 320B is coupled to the lower portion of the stator core 310, and the third inclined surface 323Ba of the second end portion 323B is coupled to the second inclined surface 323Aa of the first end portion 323A in a sliding manner. In this case, when the first end portion 323A comes into contact with the second step 324B, the sliding may be restricted, and when the second end portion 323B comes into contact with the first step 324A, the sliding may be restricted.

FIG. 2 is a perspective view illustrating the stator core and the insulator according to one embodiment of the present invention, FIG. 8 is a side view illustrating the first insulator according to one embodiment of the present invention, FIG. 9 is a plan view illustrating the first insulator according to one embodiment of the present invention, and FIG. 10 is a side view illustrating the second insulator according to one embodiment of the present invention.

Referring to FIGS. 2 and 8, the first guide 322A may include a protrusion 340 protruding from an inner circumferential surface toward a stator center S. In this case, the wound coil 330 is disposed between the protrusion 340 and the first body 321A. The protrusion 340 is a protrusion for preventing the wound coil 330 from departing from the body 321.

A length of the protrusion 340 in the axial direction may be greater than a width thereof in the circumferential direction. Referring to FIG. 9, the protrusion 340 may include a first side surface 342 and a second side surface 343 at both side portions. The first side surface 342 faces the first body 321A, and the second side surface 343 is disposed in a direction opposite to the first side surface 342. In this case, the first side surface 342 and the second side surface 343 become closer toward the stator center S.

The first side surface 342 may include a first surface 3421 and a second surface 3422. The first surface 3421 and the second surface 3422 may have different inclination angles. In this case, the first surface 3421 and the second surface 3422 may be connected to form a predetermined angle. In this case, an angle which is formed by the first surface 3421 and the second surface 3422 and faces the first body 321A may be less than 180°. That is, a portion at which the first surface 3421 and the second surface 3422 are connected may be concavely formed to face the first body 321A. In this case, the coil 330 may be seated on the concave portion at which the first surface 3421 and the second surface 3422 of the protrusion 340 are connected.

The protrusion 340 is disposed apart from the first body 321A in the circumferential direction. In addition, the protrusion 340 may be disposed above the first end portion 323A. In this case, a distance between the protrusion 340 and the first body 321A may be greater than a thickness of the coil 330. In addition, a height of the protrusion 340 may be greater than the thickness of the coil 330. In this case, the height of the protrusion 340 is a protruding length in the radial direction The protrusion 340 includes a first inclined surface 341 at a lower side thereof. In this case, a lower end of the first inclined surface 341 may extend to the first step 324A. The first inclined surface 341 is further away from the stator center S toward a lower side of the third inclined surface 341. A second inclination angle $\theta 2$ may be formed by the first inclined surface 341 and the inner circumferential surface of the first guide 322A. In this case, the second inclination angle $\theta 2$ may be in the range of 20 to 50°. Preferably, the second inclination angle $\theta 2$ may be in the range of 30 to 40°. In this case, the second inclination angle $\theta 2$ may be greater than the first inclination angle $\theta 1$. Preferably, a ratio of the first inclination angle $\theta 1$ to the second inclination angle $\theta 2$ may be in the range of 0.1 to 0.2.

A groove 320Aa may be formed in the inner circumferential surface of the first guide 322A. In this case, the groove 320Aa may be spaced apart from the first body 321A in the circumferential direction.

The groove 320Aa is formed at a side opposite to the protrusion 340 based on the first body 321A. A distance between the first body 321A and the groove 320Aa may be shorter than the distance between the first body 321A and the protrusion 340. In this case, a length of the groove 320Aa in the axial direction may be greater than a width thereof. In addition, the groove 320Aa may extend to an upper end of the first guide 322A. The groove 320Aa serves to guide an end portion of the wound coil 330 upward.

FIG. 11 is a perspective view illustrating a state in which an insulating member is being inserted into the stator.

Referring to FIG. 11, in the motor according to the present invention, an insulating member 350 having an insulating property may be disposed between the adjacent insulators 320. The insulating member 350 is a member for insulating the insulator 320 and the wound coil 330 from each other. In this case, the insulating member 350 is provided as a plurality of insulating members 350. The plurality of insulating members 350 are disposed between the insulators 320 in the circumferential direction. The insulating members 350 have plate shapes. In this case, the insulating members 350 may be insulating sheets.

The insulating members 350 are disposed after the insulators 320 of the stator 30 are assembled and the coils are wound around the insulators 320. In this case, the insulating members 350 are inserted into the stator 30 from a lower side of the stator 30.

In the conventional motor, in a process in which the insulating member 350 is inserted between insulators 320, a case of an insertion failure may occur as the insulating member 350 is hooked on a protrusion. In this case, the protrusion serves to prevent departure of a wound coil like the protrusion 340 of the present invention.

Accordingly, there are problems in that a failure due to hooking of an insulating sheet and damage to the insulating sheet occur. However, in the motor according to the present invention, since the protrusion 340 is obliquely formed in a direction in which the insulating member 350 is inserted, a phenomenon of hooking the insulating sheets can be prevented.

As described above, the motor according to one exemplary embodiment of the present invention has been described with reference to the accompanying drawings.

The above-described embodiments should be considered in an illustrative sense only and not for purposes of limitation, and the scope of the present invention is defined not by the detailed description but by the appended claims. In addition, it should be interpreted that the scope of the present invention encompasses all modifications and alterations derived from meanings and the scope and equivalents of the appended claims.

REFERENCE NUMERALS

10: SHAFT
20: ROTOR
30: STATOR
310: STATOR CORE
320: INSULATOR
320A: FIRST INSULATOR
323A: FIRST END PORTION
324A: FIRST STEP
323Ab: SECOND INCLINED SURFACE
320B: SECOND INSULATOR
323B: SECOND END PORTION
324B: SECOND STEP
323Bb: THIRD INCLINED SURFACE
330: COIL
340: PROTRUSION
341: FIRST INCLINED SURFACE
350: INSULATING SHEET

The invention claimed is:

1. A motor comprising:
a shaft;
a rotor coupled to the shaft; and
a stator disposed to correspond to the rotor,
wherein the stator includes a stator core, insulators disposed on the stator core, coils disposed on the insulators, and insulating members disposed between the insulators in a circumferential direction,
wherein the insulator includes a body on which the coil is disposed and a guide extending from one side of the body,
wherein the guide includes a protrusion protruding from an inner circumferential surface toward a center of the stator,
wherein a lower portion of the protrusion includes a first inclined surface,
wherein the protrusion includes a first side surface facing the body and a second side surface formed at a side opposite to the first side surface,
wherein the first side surface and the second side surface become closer toward the center of the stator,
wherein the first side surface includes a first surface extending from the guide and a second surface extending from the first surface, and
wherein the first surface and the second surface have different inclination angles.

2. The motor of claim 1, wherein the first surface and the second surface form an angle less than 180° toward the body.

3. The motor of claim 1, wherein:
the first inclined surface forms a first inclination angle with the inner circumferential surface of the guide to be further away from the center of the stator toward a lower side of the first inclined surface; and
the first inclination angle is in the range of 20 to 50°.

4. The motor of claim 3, wherein:
the insulator includes a first insulator and a second insulator coupled to the first insulator;
the first insulator includes a first end portion connected to the second insulator;
the second insulator includes a second end portion connected to the first insulator; and
the first end portion is disposed inside the second end portion.

5. The motor of claim 4, wherein:
the stator core includes a yoke and a tooth protruding from an inner circumferential surface of the yoke in a radial direction;
the first end portion is in contact with the inner circumferential surface of the yoke; and
the second end portion is spaced apart from the inner circumferential surface of the yoke.

6. The motor of claim 5, wherein:
the first end portion includes a second inclined surface in contact with the second end portion; and
the second end portion includes a third inclined surface which complements the second inclined surface.

7. The motor of claim 6, wherein:
the second inclined surface forms a second inclination angle with the inner circumferential surface of the yoke; and
the second inclination angle is smaller than the first inclination angle.

8. The motor of claim 7, wherein a ratio of the second inclination angle to the first inclination angle is in the range of 0.1 to 0.2.

9. The motor of claim 4, wherein:
the first insulator includes a first step in contact with the second end portion; and
the second insulator includes a second step in contact with the first end portion.

10. The motor of claim 4, wherein a lower end of the first inclined surface extend to the first step.

* * * * *